(12) United States Patent
Ota

(10) Patent No.: US 11,852,857 B2
(45) Date of Patent: Dec. 26, 2023

(54) DISPLAY DEVICE

(71) Applicant: Japan Display Inc., Tokyo (JP)

(72) Inventor: Takashi Ota, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/504,931

(22) Filed: Oct. 19, 2021

(65) Prior Publication Data

US 2022/0137281 A1    May 5, 2022

(30) Foreign Application Priority Data

Nov. 4, 2020    (JP) .................................. 2020-184169

(51) Int. Cl.
*F21V 8/00* (2006.01)
*G02F 1/1335* (2006.01)

(52) U.S. Cl.
CPC ......... *G02B 6/0023* (2013.01); *G02B 6/0051* (2013.01); *G02B 6/0053* (2013.01); *G02B 6/0073* (2013.01); *G02F 1/133614* (2021.01)

(58) Field of Classification Search
CPC .. G02B 6/0023; G02B 6/0051; G02B 6/0053; G02B 6/0073; G02F 1/133614
See application file for complete search history.

(56) References Cited

U.S. PATENT DOCUMENTS

| 7,760,291 B2* | 7/2010 | Morita | G02F 1/133611 |
| | | | 362/97.3 |
| 8,177,379 B2* | 5/2012 | Peng | G02F 1/133605 |
| | | | 362/97.3 |
| 11,079,625 B2* | 8/2021 | Watanabe | G02F 1/133345 |
| 2011/0063850 A1* | 3/2011 | Oide | G02F 1/133603 |
| | | | 362/296.01 |
| 2012/0169968 A1* | 7/2012 | Ishimori | G02B 6/0073 |
| | | | 362/602 |
| 2013/0148036 A1* | 6/2013 | Shimizu | H04N 5/66 |
| | | | 348/739 |
| 2017/0017121 A1* | 1/2017 | Park | G02F 1/133605 |
| 2019/0121193 A1* | 4/2019 | Ono | G02F 1/133528 |

FOREIGN PATENT DOCUMENTS

JP    2017-116683 A    6/2017

* cited by examiner

*Primary Examiner* — Andrew J Coughlin
*Assistant Examiner* — Jessica M Apenteng
(74) *Attorney, Agent, or Firm* — Maier & Maier, PLLC

(57) ABSTRACT

The purpose of the present invention is to realize a display device of high definition and high contrast by applying an accurate local dimming. The structure of the invention is as follows. A display device including: a display panel and a back light; in which the back light includes a light source and optical sheet group; the light source includes the light source substrate and LEDs disposed on the light source substrate; the light source is divided into segments in a plan view; at least one of the LEDs is disposed in a segment; the light source substrate, except the LEDs, is covered by a protective film; the segment is partitioned as by wall with the partition plate made of resin; the partition plate is disposed on the protective film.

13 Claims, 14 Drawing Sheets

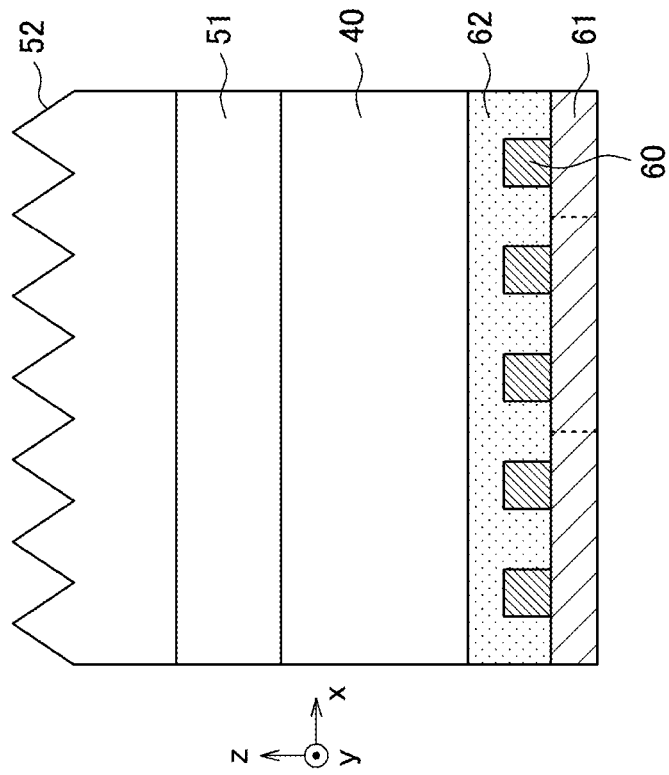
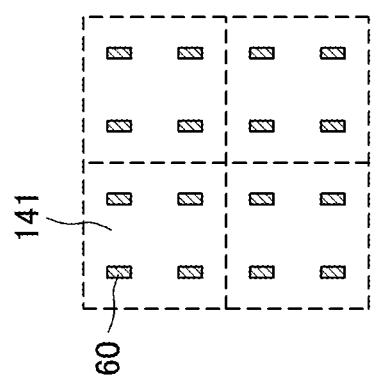

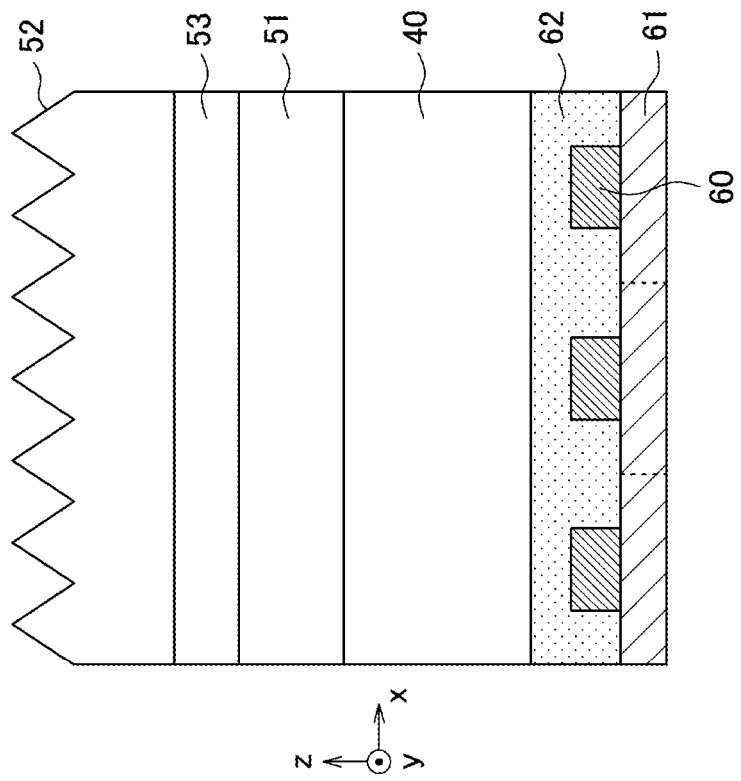
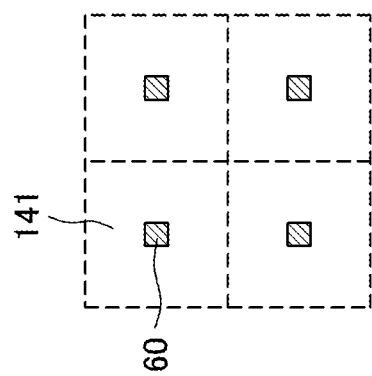

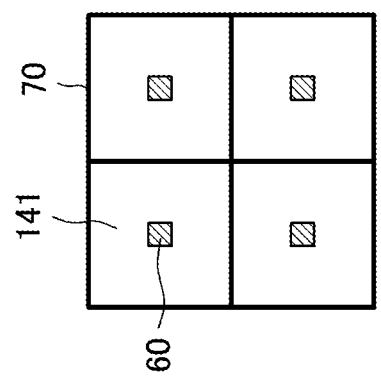
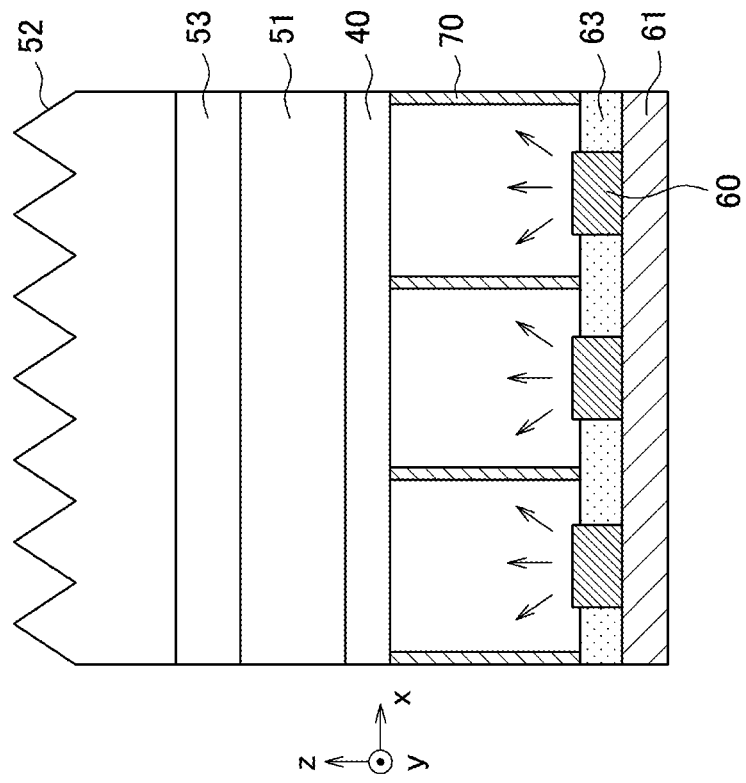

DISPLAY DEVICE

CLAIM OF PRIORITY

The present application claims priority from Japanese Patent Application JP 2020-184169 filed on Nov. 4, 2020, the content of which is hereby incorporated by reference into this application.

BACKGROUND OF THE INVENTION

(1) Field of the Invention

The present invention relates to a display device having a backlight, specifically to a liquid crystal display device in which high contrast is realized by adopting local dimming technology.

(2) Description of the Related Art

A liquid crystal display device has a TFT substrate, in which pixels having pixel electrodes, TFTs (Thin film transistors) and so forth, are formed in matrix, a counter substrate opposing to the TFT substrate, and a liquid crystal layer sandwiched between the TFT substrate and the counter substrate. Images are formed by controlling the transmittance of light by liquid crystal molecules in each of the pixels.

On the other hand, in an organic EL display device, pixels are formed in matrix, and in each of the pixels, a photo emitting layer by organic EL layer, a driving TFT, a control TFT and so forth are formed; light emitting intensity from the organic EL layer is controlled in each of the pixels to form images. Since an organic EL display device is self-luminance, contrast of the image is superior.

However, a size of the pixels can be made smaller in a liquid crystal display device, thus, the definition is superior in the liquid crystal display device. Consequently, a local dimming (method) has been developed to improve contrast of the image in the liquid crystal display device. Patent document 1, for example, discloses a technology of local dimming.

PRIOR TECHNICAL DOCUMENT

Patent Document

Patent document 1: Japanese patent application laid open No. 2017-116683

SUMMARY OF THE INVENTION

Images of higher definition and higher contrast are required in displays for VR (Virtual Reality) and medical usage. When a local dimming is adopted in those displays, finer controlling in local dimming is necessary.

In such a display, some measures are taken to further raise contrast of the image by more effective local dimming such as making a size of segment, which is a unit of local dimming, smaller and controlling light in a segment not to influence neighboring segments.

According to the area of the segment becomes smaller, it becomes difficult to set a plural LEDs in one segment. On the other hand, when only one LED is set in each of the segments, there arises a problem of uniformity in luminance distribution, that is to say, the LED becomes visible from the screen side. If a diffusion sheet is set to counter measure this problem, for example, light in the segment leaks to neighboring segments through an influence of the diffusion sheet.

The purpose of the present invention is to solve the above explained problems, and to enable effective local dimming, thus, to realize a screen of a high definition and high contrast in a display device having a back light.

The present invention solves the above explained problems; the concrete measures are as follows.

(1) A display device including: a display panel and a back light; in which the back light includes a light source and optical sheet group; the light source includes a light source substrate and LEDs disposed on the light source substrate; the light source is divided into segments in a plan view; at least one of the LEDs is disposed in a segment; the light source substrate, except the LEDs, is covered by a protective film; the segment is partitioned as by wall with a partition plate made of resin; and the partition plate is disposed on the protective film.

(2) The display device according to (1); in which a light guide is disposed between the optical sheet group and the partition plate, the partition plate contacts the light guide.

(3) The display device according to (1); in which an emitting region of the LED is nearer to the optical sheet group than a top surface of the protective film is.

(4) The display device according to (1); in which an area surrounded by the partition plate is a space.

(5) The display device according to (1); in which the partition plate is made of white PET resin.

(6) The display device according to (1); in which the protective film is made of white resin.

(7) The display device according to (1); in which the LED is a blue LED, and the optical sheet group includes a color conversion sheet.

BRIEF DESCRIPTION OF THE DRAWINGS

FIG. 4 is a plan view of comparative example 1 in which four LEDs are disposed in one segment;

FIG. 5 is a cross sectional view of comparative example 1 in which four LEDs are disposed in one segment;

FIG. 6 is a plan view of comparative example 2 in which one LED is disposed in one segment;

FIG. 7 is a cross sectional view of comparative example 2 in which one LED is disposed in one segment;

FIG. 8 is a plan view of a segment of embodiment 1;

FIG. 9 is a cross sectional view of a segment of embodiment 1;

DETAILED DESCRIPTION OF THE PREFERRED EMBODIMENTS

The present invention is explained by the following embodiments in detail.

Embodiment 1

Figure 1:
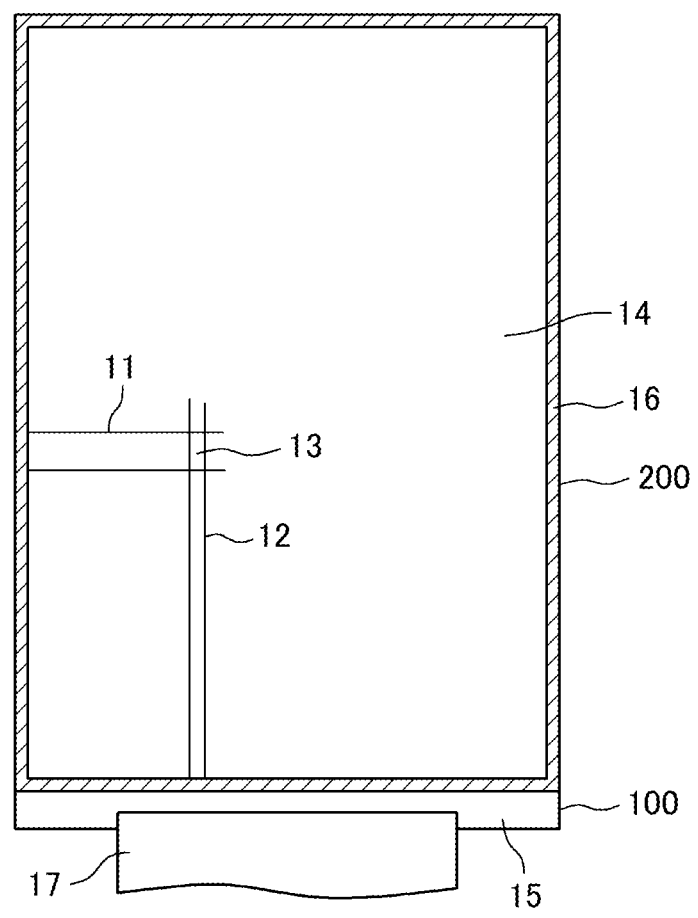
FIG. 1 is a plan view of a liquid crystal display device.

FIG. 1 is a plan view of an example of the liquid crystal display device. In FIG. 1, the TFT substrate 100 and the counter substrate 200 adheres to each other with the seal material 16; the liquid crystal layer is sandwiched between the TFT substrate 100 and the counter substrate 200. The display area 14 is formed in the area TFT substrate 100 and the counter substrate 200 overlap. In the display area 14 of the TFT substrate 100, the scan lines 11 extend in lateral direction (x direction) and are arranged in longitudinal direction (y direction); the video signal lines 12 extend in longitudinal direction and are arranged in lateral direction. The pixel 13 is formed in the area surrounded by the scan lines 11 and the video signal lines 12.

The terminal area 15 is formed in the area that the TFT substrate 100 does not overlap the counter substrate 200. The flexible wiring substrate 17 is connected to the terminal area 15 to supply signals and powers to the liquid crystal display panel. The driver IC which drives the liquid crystal display panel is installed on the flexible wiring substrate 17. A back light is set at rear side of the TFT substrate 100 as shown in FIG. 2.

Figure 2:
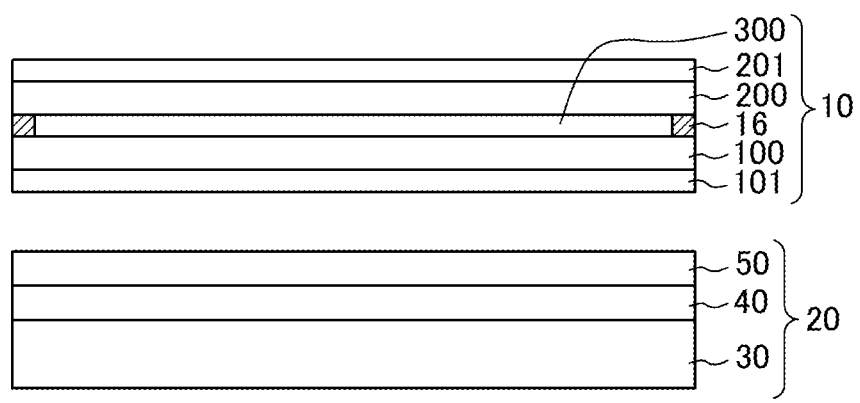
FIG. 2 is a cross sectional view of a liquid crystal display device.

FIG. 2 is a cross sectional view of the liquid crystal display device. In FIG. 2, the back light 20 is set at the rear side of the liquid crystal display panel 10. The liquid crystal display panel 10 has a structure as follows. The counter substrate 200, on which the black matrix and the color filter and so forth are formed, is set opposing to the TFT substrate 100, on which the pixel electrodes, the common electrodes, the TFTs, the scan lines, video signal lines and so forth are formed. The TFT substrate 100 and the counter substrate 200 adhere to each other at their periphery with the seal material 16, and the liquid crystal 300 is sealed thereinside.

The liquid crystal molecules get an initial alignment through the alignment films formed on the TFT substrate 100 and the counter substrate 200. When a voltage is applied between the pixel electrode and the counter electrode, the liquid crystal molecules rotate to control the transmittance of light from back light 20, thus, images are formed. Since the liquid crystal 300 can control only the polarized light, the bottom polarizing plate 101 is set under the TFT substrate 100 to pass only the polarized light for the liquid crystal 300. The modulated light through the liquid crystal 300 is analyzed by the top polarizing plate 201, thus, images are made visible.

In FIG. 2, the back light 20 is set at the rear side of the liquid crystal panel 10. The back light 20 has a structure such that the light guide 40 is set on the light source 30, and the optical sheet group 50 is set on the light guide 40. There are two types of back light 20 for the display device; that is to say, a side light type back light in which the light source as the light emitting diodes (LEDs) and the like are set on a side of the light guide, and a direct back light in which the LEDs and the like are set under the light guide. The present invention is adopted in the direct back light.

In FIG. 2, the light guide 40 is set on the light source 30. The light guide 40 is made from a transparent resin. The light guide 40 in FIG. 2 has a role to make the light entered from the LED, which is a point light source, uniform by reflecting the light at the interface.

The optical sheet group 50 is set on the light guide 40. The optical sheet group 50 includes a prism sheet, a diffusion sheet and the like. In addition, when the blue color LED is used for the light source, a color conversion sheet, in which the fluorescent material is dispersed in the resin sheet, may be used to convert the blue light to the white light. The color conversion sheet may use quantum dots. Further, the polarizing reflection sheet may be used to utilize the light more efficiently. What kind of optical sheet is used or how many of those optical sheets are used is determined by a kind of the display device.

When images are formed, liquid crystal display device transmits light from the back light at bright portion of the image and light is blocked at the dark portion of the image. The contrast of the image is defined by a ratio of a bright portion and a dark portion. The dark portion is formed shielding light from the back light by the liquid crystal. The light shielding by the liquid crystal, however, is not perfect, but some leak of light occurs; consequently, the contrast is degraded.

Figure 3:
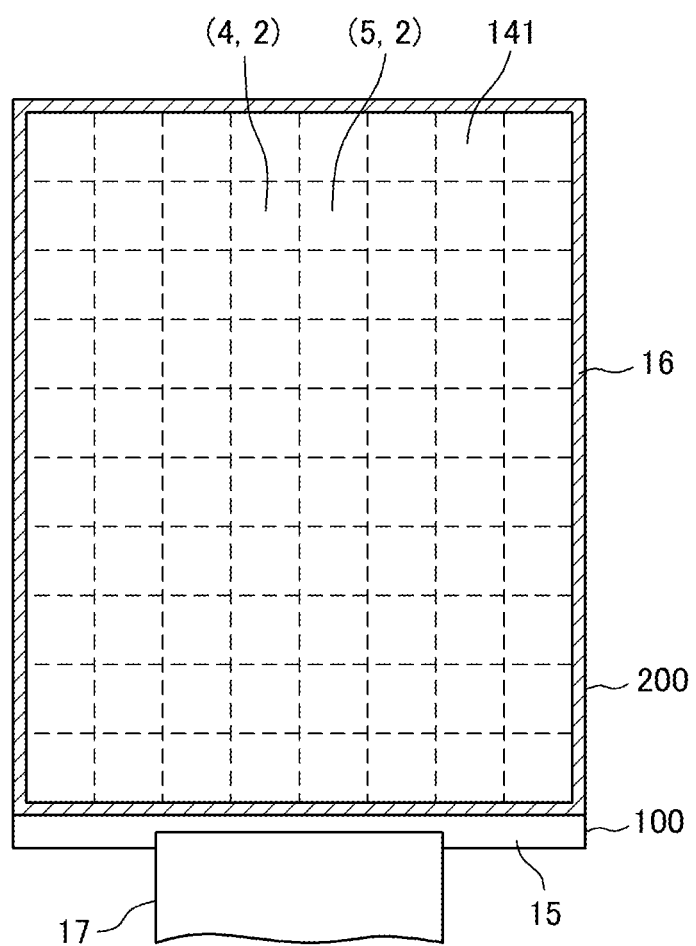
FIG. 3 is a plan view in which examples of segments are shown in local dimming method.

A local dimming enables a deep dark display by not applying light from the back light to the dark region of the images; consequently, a high contrast can be realized. FIG. 3 is an example of the liquid crystal display device having a local dimming. FIG. 3 is a plan view of the liquid crystal display device, the structure of which is the same as explained in FIG. 1. In FIG. 3, the display area 14 is divided into segments 141. The broken lines express the border of the segments 141, however, they are only for convenience sake; there are no such borders in the actual liquid crystal display panel. The light sources in the back light are set in each of the segments.

In FIG. 3, it is premised as that the segment (4, 2) is a bright portion and the segment (5, 2) is a dark portion. In the local dimming, the light source, namely, the LED is light on at the segment (4, 2), the light source, namely, the LED is light off at the segment (5, 2). Thus, the black display at the segment (5, 2) becomes a deep black; consequently, high contrast can be realized.

However, there is no actual border between the segments, thus, the light in the segment (4, 2) may influence the segment (5, 2). Therefore, light from the back light can be applied to (5, 2), which is to display black; consequently, the effect of the local dimming cannot be thoroughly performed.

FIGS. 4 and 5 are comparative examples of the back light to mitigate such problems. FIG. 4 is a plan view in which placement of the LEDs as the light source in each of the segments 141 is shown. Herein after, the light source is expressed as the LED 60. In FIG. 4, each of the segments 141 are partitioned by the broken lines. The broken lines are, however, for the sake of convenience; there is no such a border in the actual device. A dimension of each of the segments is 4 mm square or less; in FIG. 5, e.g., 2 mm square. The dimensions of the segments 141 in the examples below are the same.

In FIG. 4, four LEDs 60 are placed in each of the segments 141. That is to say, a brightness of each of the LEDs 60 can be made low by setting four ELDs 60 in one segment 141. As a result, an amount of light that leaks to the neighboring segment can be made small.

FIG. 5 is a cross sectional view of the back light according to the comparative example 1. The LEDs 60 are set on the light source substrate 61; the transparent resin 62 is formed covering the LEDs 60. The blue light LED is used as the LED 60. Acrylic resin or silicone resin is used as the transparent resin 62. The transparent resin 62 is for protection of the LEDS 60, electrodes, wirings and the like formed on the light source substrate 61. The broken lines in the light source substrate 61 are borders between the segments for convenient sake.

The light guide 40 is set on the transparent resin 62. Even the light guide 40 is transparent, it reflects the light entered the light guide 40, at the interface, thus, makes light from the LEDs uniform. The color conversion sheet 51 is set on the light guide 40. The phosphorous material, which converts blue light to yellow light is dispersed in the color conversion sheet 51; thus, the blue light is converted to white light through the color conversion sheet 51. A thickness of the color conversion sheet 51 is e.g. 50 to 70 microns.

The prism sheet 52 is set on the color conversion sheet 51. The configuration of the prism sheet 52 is that the prisms, whose cross sections are triangle, extend in y direction, and are arranged x direction. The role of the prism sheet 52 is to direct the light, which exists obliquely from major surface of the color conversion sheet 51, to the direction perpendicular to the major surface of the color conversion sheet 51, thus, to raise a utilization efficiency of light. One prism sheet 52 is used in FIG. 5, however, another prism sheet, which has a prism array extends perpendicular to the prims array of prism sheet 52, may be added. A thickness of the prism sheet is as that: a thickness of the prism portion, namely, a height of the prism, is 50 microns, a thickness of the base is 70 microns, and a total thickness is 120 microns.

In FIG. 4 and FIG. 5, four LEDs 60 are placed in one segment 141. Therefore, the brightness of each of the LEDs 60 can be lowered, thus, leak of light to the neighboring segments 141 can be made smaller. However, placing four LEDs 60 per one segment 141 can be a problem in a view of cost. In addition, when a size of the segment 141 becomes smaller, enough space may not be provided for four LEDs 60.

FIG. 6 and FIG. 7 is a comparative example 2 in which one LED 60 is set in each of the segment 141. FIG. 6 is a plan view in which the placement of the LED 60 in each of the segments 141 is shown in the back light. In FIG. 6, the segments 141 are divided by the broken lines, however, those broken lines are for sake of convenience, the lines are not formed in the actual product.

In FIG. 6, one LED 60 is placed in each of the segments 141. A brightness of the LED 60 in FIG. 6 is much higher than the LED 60 in comparative example 1 because only one LED 60 supplies light for entire segment 141. If a brightness of LED 60, which is a point light source, is high, a high brightness portion is visible when viewed from the screen side. Therefore, as will be explained later, the diffusion sheet 53 is included in the optical sheet group 50 to counter measure this problem.

FIG. 7 is a cross sectional view of the back light according to comparative example 2. The LEDs 60 are set on the light source substrate 61; the transparent resin 62 is formed covering the LEDs 60. The structure of FIG. 7 is the same as FIG. 5 except only one LED 60 exists in one segment in FIG. 7.

The light guide 40 is set on the transparent resin 62. The role of the light guide 40 is the same as explained in comparative example 1. The color conversion sheet 51 is set on the light guide 40. The role of the color conversion sheet 51 is the same as explained in comparative example 1. In FIG. 7, the diffusion sheet 53 is set on the color conversion sheet 51. The diffusion sheet 53 diffuses light from the light source 60 to make the brightness uniform. A thickness of the diffusion sheet 53 is e.g. 50 to 200 microns.

That is to say, since there is only one LED 60 in the segment 141, luminance of the LED 60 needs to be high to supply enough light for entirety of the segment 141. Consequently, a portion corresponding to the LED 60 is seen as a light emitting point visible in the screen. This light emitting point may be called a bright point in this specification, herein after. The role of the diffusion plate 53 is to suppress the bright point corresponding to the LED 60 by diffusing light.

However, since the diffusion plate 53 diffuses light, it also diffuses light from the LED 60 into the neighboring segments 141. In other words, the structure of FIG. 7 has a problem that light leaks not only from the transparent resin 62, which covers LED 60, the light guide 40 and the color conversion plated 51, but also from the diffusion plate 53 to the neighboring segments 141. By the way, the structure and the function of the prism sheet 52 is the same as explained in FIG. 5.

FIG. 8 and FIG. 9 are the structure of embodiment 1 according to the present invention, which overcomes the above explained problems. FIG. 8 is a plan view in which the placement of the LED 60 as a light source in each of the segments 141 is shown in the back light. The LED 60 is a blue LED in this embodiment. In FIG. 8, the segments 141 are formed by the partition plate 70. The partition plate 70 has a structure that thin plates of resin are assembled like grid as shown FIG. 10. A size of each of the segments is 4 mm square or less, e.g. 2 mm square.

In FIG. 8, one LED 60 is placed in each of the segments 141; therefore, luminance of the LED 60 is high. However, as will be explained later, since a leak of light from the LED 60 to the neighboring segments is small, luminance of the LED 60 of embodiment 1 can be low than the LED 60 of comparative example 2.

FIG. 9 is a cross sectional view of the back light of embodiment 1. In FIG. 9, the LED 60 is set on the light source substrate 61. The structure of LED 60 is explained later. In FIG. 9, the protective film 63 is formed covering wirings and electrodes formed on the light source substrate 61. This structure is very different from the structures of comparative examples 1 and 2. That is to say, the LED 60 is not covered by the transparent resin 62, and the light emitting area of the LED 60 exists above the top of the protective film 63. Therefore, the protective film 63 is not necessarily to be transparent. In other words, the transparent resin 62 in comparative examples 1 and 2 does not exist in embodiment 1.

In the structure of FIG. 9, the protective film 63 is made of white resin; a reflectivity of the protective film 63 is preferably high. Such resin can be made of silicone resin. A part of light emitted from the LED 60 reflects at the partition plate 70 or the light guide 40, then enters the protective film 63; if the reflectivity of the protective film 63 is high, the light is reflected at the surface of the protective film 63 and goes toward a direction of the liquid crystal display panel.

In FIG. 9, the partition plate 70 is formed at the border between the segments; the partition plate 70 is on the protective film 63. The partition plate 70 is made of white PET (Polyethylene terephthalate). Light exiting from the LED 60 obliquely reflects at the partition plate 70 and goes toward the light guide 40. The transparent light guide 40 is set on the partition plates 70. The light entered the light guide 40 reflects in the light guide 40, thus, luminous unevenness due to existence of the partition plates 70 is mitigated. In the meantime, white PC (Polycarbonate) can be used for the partition plate 70 instead of white PET. As to a partition plate 70, a unitized partition plate 70 can be used, or several blocks of partition plates 70 can be disposed side by side.

In comparative examples 1 and 2, light from the LED 60 leaks to neighboring segments through the transparent resin 62, which covers the LED 60; in the structure of embodiment 1, however, as shown in FIG. 9, light emitted from the LED 60 reflects at the partition plate 70, thus, light does not leak to neighboring segments.

In FIG. 9, the color conversion sheet 51 is disposed on the light guide 40. The structure and the function of the color conversion sheet 51 are the same as explained in comparative example 1. The color conversion sheet 51, which includes phosphorous material, is used in this embodiment, however, the color conversion sheet including quantum dots also can be used. A thickness of the color conversion sheet 51 depends on material, one example can be 500 microns. The diffusion sheet 53 is disposed on the color conversion sheet 51. The role of the diffusion sheet 53 is to make the bright spot due to the LED 60 not visible from the screen. Light from the LED 60, however, is diffused by the diffusion sheet 53, and the light diffuses into neighboring segments. In the meantime, in FIG. 9, a leak to the neighboring segments is suppressed by the partition plate 70, thus, luminance intensity of the LED 60 can be decreased; consequently, influence of light diffused into the neighboring segments 141 through the diffusing sheet 53 can be mitigated.

In FIG. 9, the prism sheet 52 is disposed on the diffusion sheet 53, which is the same as comparative examples 1 and 2. The structure and the function of the prism sheet 53 are also the same as explained in comparative examples 1 and 2. By the way, the optical sheet group in FIG. 9 is an example; other optical sheets also can be available.

Figure 10:
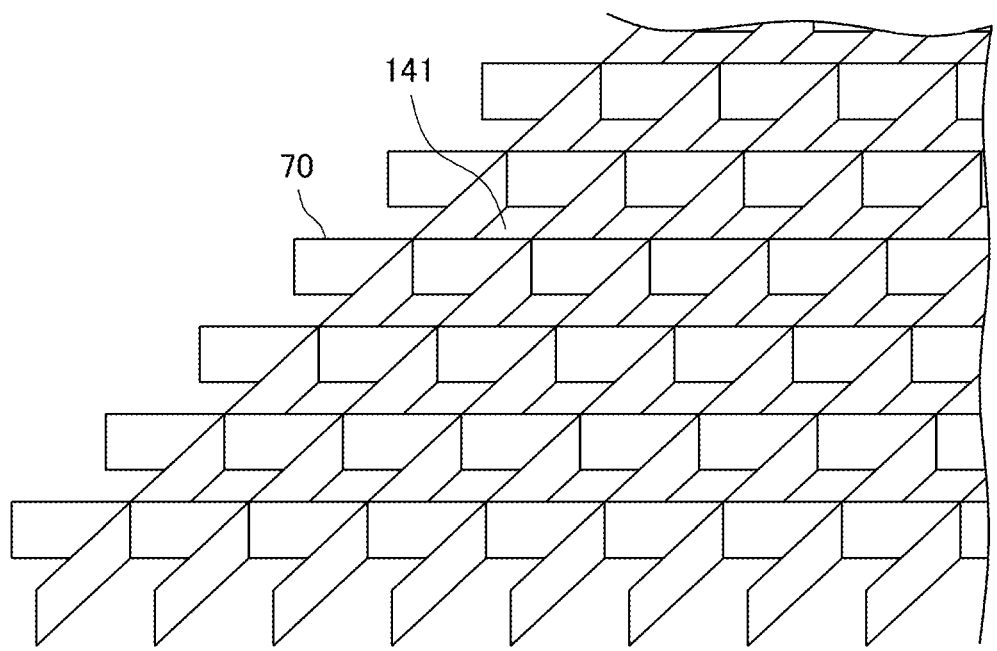
FIG. 10 is a perspective view of the partition plate.

FIG. 10 is a perspective view of the partition plate 70. The partition plate 70 has a structure that white PET plates of a thickness of e.g. 0.2 mm are assembled in grid shape. The segment 141 is formed in an area surrounded by the partition plates 70. A size of the segment is e.g. 2 mm square; a height of the partition plate 70 is e.g. 1 mm.

Figure 11:
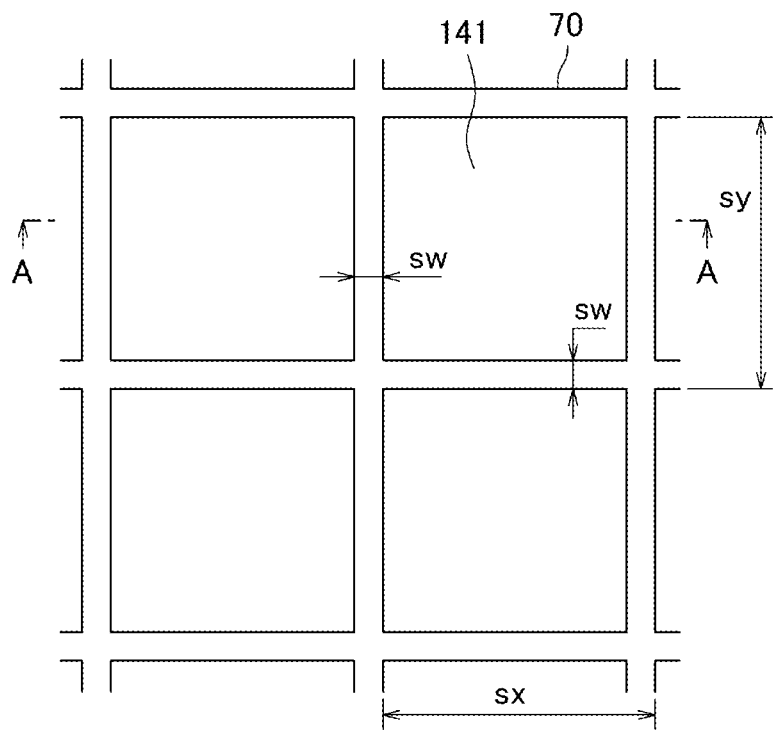
FIG. 11 is a plan view of the partition plate.
Figure 12:
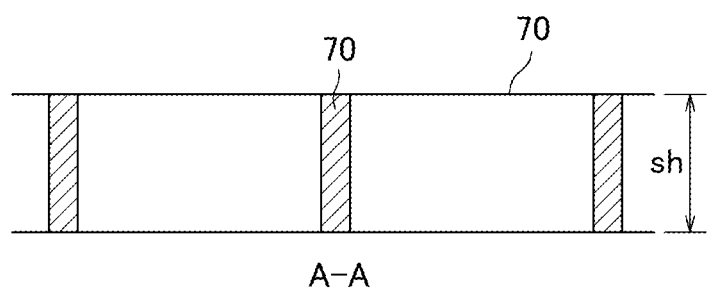
FIG. 12 is a cross sectional view of FIG. 11 along the line A-A.

FIG. 11 is a plan view of the partition plate 70. A thickness sw of the partition plate 70 is around 0.2 mm. As to a size of the segment 141, each of sx and sy is 4 mm or less, and is for example, approximately 2 mm. FIG. 12 is a cross sectional view along the line A-A of FIG. 11. A height sh of the partition plate 70 is in a range of 0.5 to 2 mm, and is for example, 1 mm.

Figure 13:
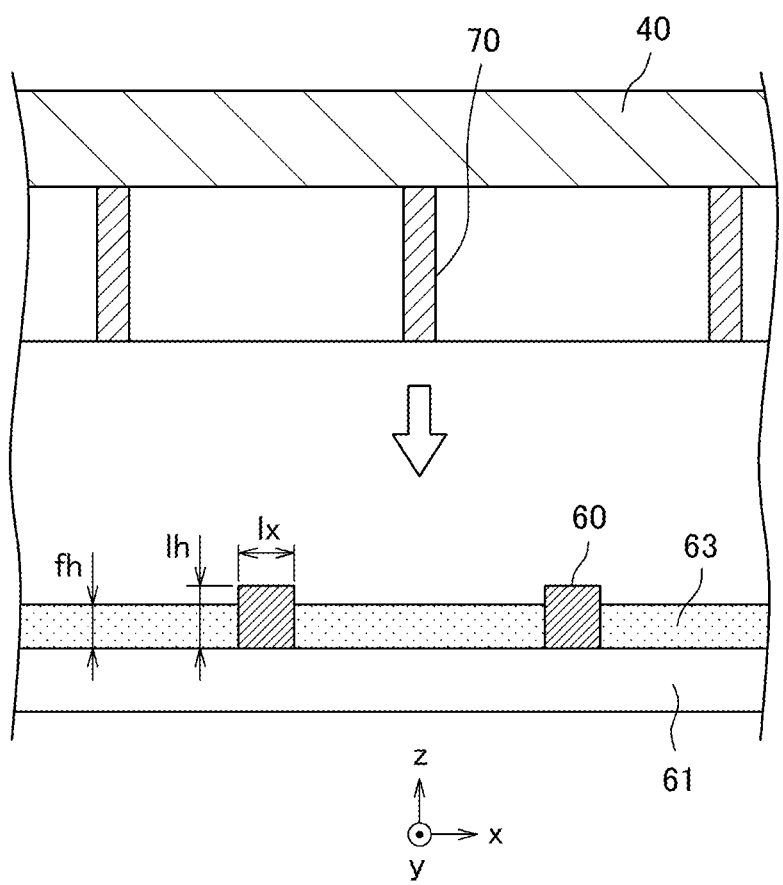
FIG. 13 is a cross sectional view in which the partition plate is attached to the light guide, and is in a process of being set on the light source substrate.

The shape of the partition plate 70 is unstable because it is formed as that thin white plates of PET are assembled in grid shape as shown in FIG. 10. Therefore, in manufacturing process, it is rational to fix the partition plate 70 to the light guide 40 at first as shown in FIG. 13, after that it is assembled with the light source substrate 61, on which the LEDs 60 and the protective film 63 are disposed. FIG. 13 is a cross sectional view in which the partition plate 70, which is attached to the light guide 40, is in a process of being set on the protective film 63, which is formed on the light source substrate 61.

In FIG. 13, the LEDs 60 are set on the light source substrate 61; the light source substrate 61 is covered by the protective film 63 except the LEDs 60. The protective film 63 can have a role of a reflective film, too. In FIG. 13, the plan view of the LED 60 is rectangle, preferably square; a width lx is in a range of 0.1 to 0.5 mm. A height lh of the LED 60 is e.g. 0.5 mm. A thickness fh of the protective film 63 is 0.3 mm. The light emitting region of the LED 60 exists at upper portion than a top surface of the protective film 63; that is to say, the emitting region of the LED 60 is nearer to the light guide 40 than the top of the protective film 63 is.

Figure 14:
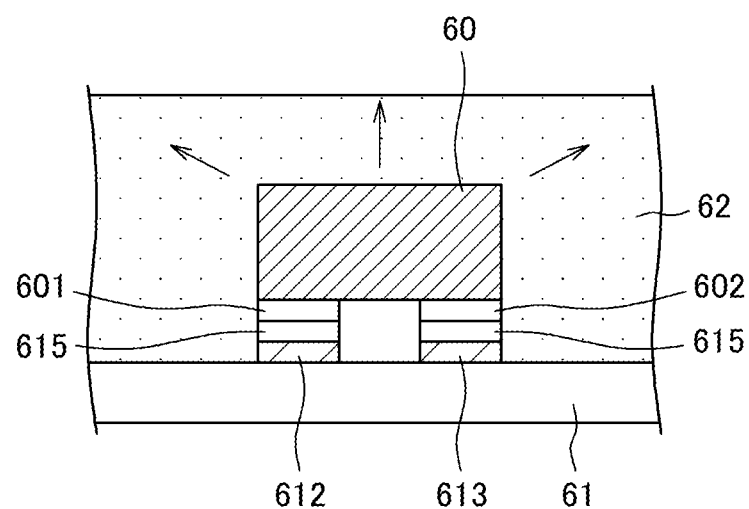
FIG. 14 is a cross sectional view of the light source substrate in the vicinity of the LED according to comparative example 2.
Figure 15:
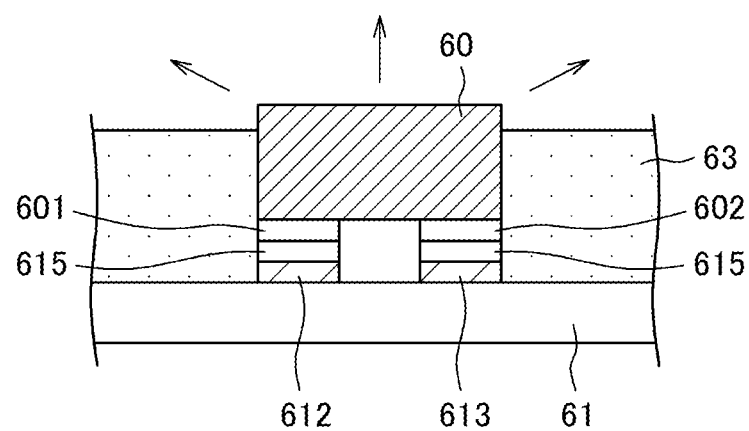
FIG. 15 is a cross sectional view of the light source substrate in the vicinity of the LED according to embodiment 1.

FIG. 14 and FIG. 15 are cross sectional views of light sources. FIG. 14 is a structure of the light source of comparative example 2 and FIG. 15 is a structure of the light source of embodiment 1. The structure of the LED 60 is the same in both FIG. 14 and FIG. 15. A difference between FIG. 14 and FIG. 15 is that the transparent resin 62 is formed covering the LED 60 in FIG. 14, while white protective film 63 covers the light source substrate except the LED 60 in FIG. 15.

In FIG. 14, the light source substrate 61 is formed from e.g. epoxy resin. The electrode pad 612, which connects with the anode 601 of the LED 60, and the electrode pad 613, which connects with the cathode 602 of the LED 60, are formed on the light source substrate 61. Several other wrings are formed on the light source substrate 61, however, they are omitted in FIG. 14. The LED 60 is connected to the electrode pads 601 and 602 on the light source substrate 61 through flip chip bonding. The electrode terminals 601 and 602 of the LED 60 are opposed to the electrode pads 612 and 613, and then, they are connected to each other by the solder 615. The LED 60 has a structure in which p-type semiconductor and n-type semiconductor are joined to have a p-n junction. LED 60 is formed from various layers to raise a light emitting efficiency.

In FIG. 14, the LED 60 is covered and protected by the transparent resin 62. When a voltage is applied to the LED 60, light is mitted from the interface between the p-type layer and the n-type layer. Light is emitted not only to an upper direction but also is emitted to a lateral direction. This phenomenon is depicted by arrows in FIG. 14. The problem of the structure of FIG. 14 is that the light emitted to lateral direction propagates through inside of the transparent resin 62 and enters neighboring segments 141. As a result, a precise local dimming cannot be attained.

FIG. 15 is a cross sectional view of light source portion according to embodiment 1. The structure of the light source substrate 61 and the structure of the LED 60 in FIG. 15 are the same as those explained in FIG. 14. FIG. 15 differs from FIG. 14 in that the transparent resin, which covers entire LEDs 60, does not exist, however, the white protective film 63 is formed to cover the electrodes and the like formed on the light source substrate 61, however, the white protective film 63 does not cover the light emitting surface of the LED 60. That is to say, the light emitting portion of the LED 60 is not covered by the protective film 63.

Therefore, light from the LED 60 is emitted directly to the space. As shown by arrows in FIG. 15, the light from the LED 60 is emitted also to lateral direction, however, as shown in FIG. 9, this light is reflected by the partition plate 70, which is disposed at the border between the segments, thus, the light does not enter the neighboring segments. On the other hand, the light, which goes bottom direction, due to reflection at the light guide 40 and the partition plate 70, is reflected by the white protective film 63, which has a role of reflector, and thus, the light goes toward the light guide 40 again. As explained above, the light source according to FIG. 15 has a high efficiency in light utilization and a structure that light does not enter the neighboring segments; thus, precise local dimming can be attained.

Figure 16:
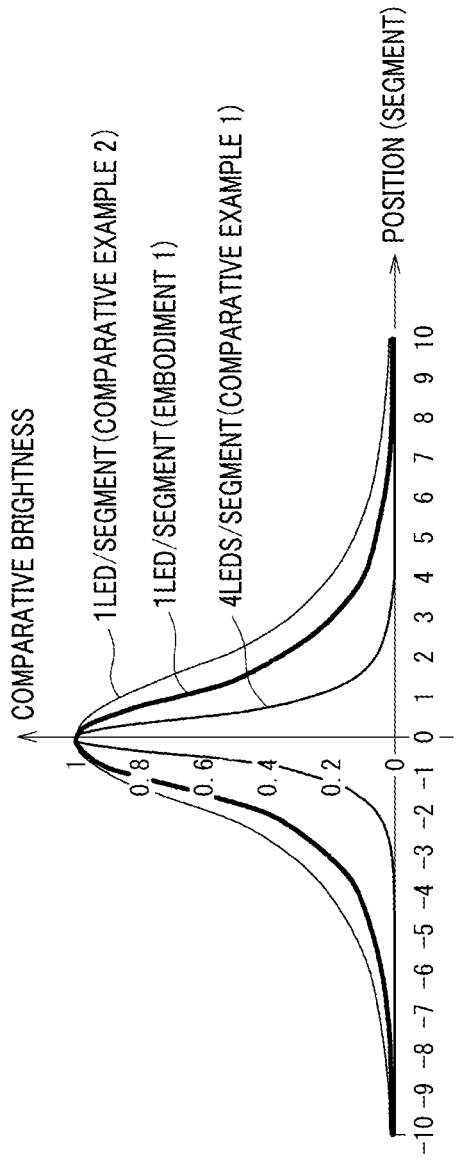
FIG. 16 is a graph that shows an effects of the present invention.

FIG. 16 is a graph and a table, which show comparison in leak of light to the neighboring segments in the cases: comparative example 1 (four LEDs in one segment (4

LEDs/Segment)), comparative example 2 (one LED in one segment (1 LED/Segment)) and embodiment 1 (one LED in one segment (1 LED/Segment)). The data in the graph and in the table of FIG. 16 are the same.

In the graph of FIG. 16, unit of the abscissa is segment. In FIG. 16, zero in abscissa means a center of the segment where the LED is lighted on. Therefore, the border between the light on segment and the neighboring segment is expressed as 0.5 or –0.5. That is to say, the "border" in the table in FIG. 16 means 0.5 or –0.5 at the abscissa of the graph in FIG. 16. The "border beyond one segment" in the table in FIG. 16 means 1.5 or –1.5 at the abscissa of the graph, and the "border beyond two segments" in the table in FIG. 16 means 2.5 or –2.5 at the abscissa of the graph in FIG. 16.

Perception of chip in the table in FIG. 16 means whether a bright point according to the LED 60 is visible or not in the screen. In the table of FIG. 16, the open circle means the bright point of the LED 60 is not visible. That is to say, when only one LED 60 is used in one segment, the bright point tends to be generated; however, in this case, the diffusion sheet is used to suppress the bright point. On the other hand, existence of diffusion sheet means a leak of light to the neighboring segments tends to occur through diffusion in the diffusion sheet.

The ordinate of the graph in FIG. 16 is a comparative brightness. That is to say, in each of the cases, the abscissa means a brightness at each of the point, provided the brightness at the center of the light on segment is 1. In the graph and the table in FIG. 16, the brightness becomes symmetrical about the ordinate theoretically; however actual data is asymmetrical due to an experimental error. The tendency of the phenomenon, however, is recognizable.

In FIG. 16, a leak of light to the neighboring segment is least in comparative example 1 in which four LEDs 60 are used in one segment. In comparative example 1, since four LEDs 60 are used, a luminance of each of the LEDs 60 is not high, thus, light does not reach to a far distance. In addition, since a luminance of each of the LEDs is low, a bright point tends not to be generated; thus, a diffusion sheet is not used. Therefore, diffusion of light due to the diffusion sheet does not occur. Since the structure of comparative example 1 uses plural LEDs in one segment, it has a problem of higher manufacturing cost and a spatial problem for setting the plural LEDs when the segment becomes smaller.

In FIG. 16, a leak of light to the neighboring segments is largest in the structure of comparative example 2. In comparative example 2, since one LED is used in one segment, the LED of high luminance is used; thus, the light reaches to a far distance. In addition, since the diffusion sheet 53 is used to suppress "perception of chip" namely, the bright point in the screen, light leaks into the neighboring segments through the diffusion effect in the diffusion sheet 53.

In FIG. 16, even one LED is used in one segment, leak of light to the neighboring segments in embodiment 1 is much smaller compared with that of comparative example 2. That is to say, a leak of light to the neighboring segments in the light source portion is suppressed by the partition plate 70 as shown in FIG. 9. In addition, as shown in FIG. 15, a leak of light through the transparent resin is suppressed because the transparent resin, which covers the LED 60, does not exist.

As described above, a leak of light at the light source portion can be suppressed, however, a leak of light through the light guide 40 or the optical sheet group 50 exists. In addition, since only one LED is used in one segment, the diffusion sheet 53 is necessary to suppress "perception of chip" namely, the bright point in the screen, light leaks into the neighboring segments through the diffusion effect in the diffusion sheet 53.

In embodiment 1, however, as explained in FIG. 9 and FIG. 15, utilization efficiency of light is improved at the light source portion, consequently, a luminance of the LED 60 can be decreased. Therefore, a leak of light through the light guide 40 or the optical sheet group 50 and a leak of light through diffusion in the diffusion sheet 53 can be suppressed.

As described above, according to embodiment 1, a leak of light to the neighboring segments can be decreased even only one LED 60 is used in one segment 141. Therefore, the structure of embodiment 1 can be used to the high definition display device, which has smaller segments 141, while maintaining necessary contrast. In addition, since number of LEDs 60 can be decreased, manufacturing cost of the backlight can be decreased.

Embodiment 2

In the structure of embodiment 1, as shown in FIG. 9, the protective film 63 formed on the light source substrate 61, and the light guide 40 are adhered to each other through the partition plate 70. The partition plate 70 has a structure that white thin plates are assembled in grid. The adherence between the partition plate 70 and the light guide 40 or between the partition plate 70 and the protective film 63 are so called a line bonding, which may have a problem of adherence strength.

Figure 17:
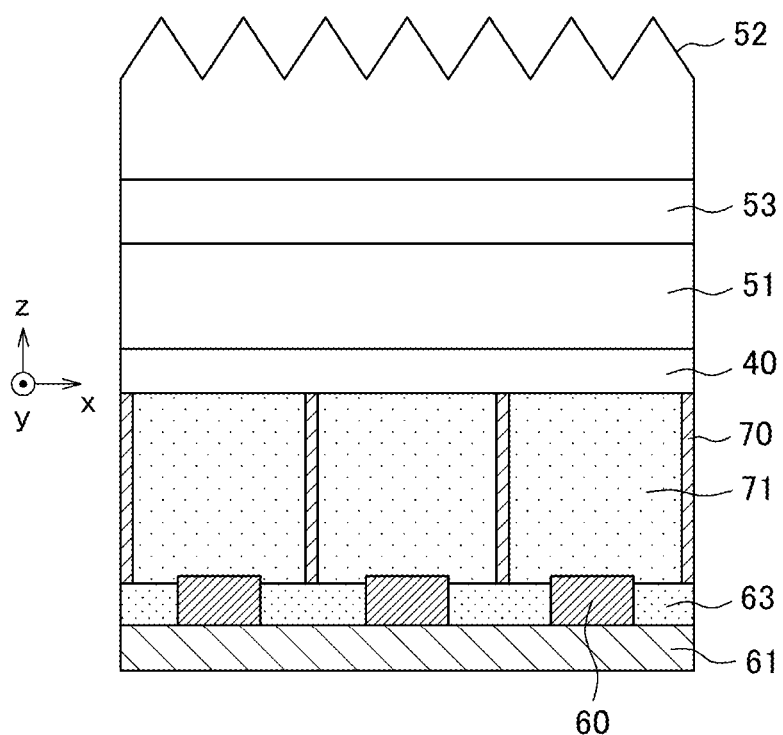
FIG. 17 is a cross sectional view of the segment of the back light according to embodiment 2.

Embodiment 2 counter measures this problem; FIG. 17 is a cross sectional view of the back light according to embodiment 2. FIG. 17 differs from FIG. 9 in that the area surrounded by partition plates is not a space but is filled with transparent filling resin 71. If transparent filling resin 71 is the same as the material for adhering with the protective resin 63 or the material for adhering with light guide 40, adhering of the transparent filling resin 71 with the light source substrate 61 and with the light guide 40 can be stabilized. Acrylic resin or silicone resin can be used as the transparent filling material 71.

In this case, a refractive index of the transparent filling resin 71 should be differentiated from a refractive index of the partition plate 70, which is made of PET. If the refractive index is the same between the transparent filling resin 71 and the partition plate 70, the partition plate 70 is to have no effect. A large difference in the refractive indices between the transparent filling resin 71 and the partition plate 70 is preferable for enough reflection at the partition plate 70. In addition, it is further preferable that a refractive index of the transparent filling resin 71 is larger than a refractive index of the partition plate 70 because a chance of total reflection increases.

In embodiment 2, the partition plate 70 can be installed stably on the light source substrate 61, therefore, the light guide 40 can be eliminated if shading of the partition plate 70 and the like do not influence the screen.

Embodiment 3

Figure 18:
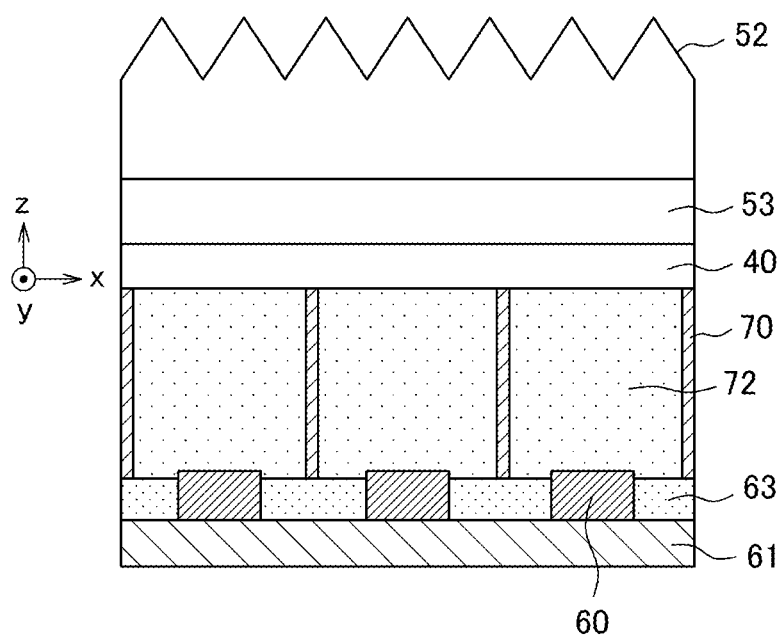
FIG. 18 is a cross sectional view of the segment of the back light according to embodiment 3.

FIG. 18 is a cross sectional view in which the structure of embodiment 3 is shown. FIG. 18 differs from FIG. 17, which is embodiment 2, in that e.g. yellow phosphorous material, as a color conversion material, is dispersed in the transparent filling resin 71. Consequently, white light enters the light guide 40.

That is to say, the color conversion sheet 51 is not necessary in embodiment 3 as shown FIG. 18, therefore a leak of light through the color conversion sheet 51 can be suppressed. The transparent filling resin 71 stabilizes adherence between the light guide 40 and the light source substrate 61, which is the same as explained in embodiment 2.

In embodiment 3, too, the partition plate 70 can be installed stably on the light source substrate 61, therefore, the light guide 40 can be eliminated if shading of the partition plate and the like do not influence the screen.

Embodiment 4

Figure 19:
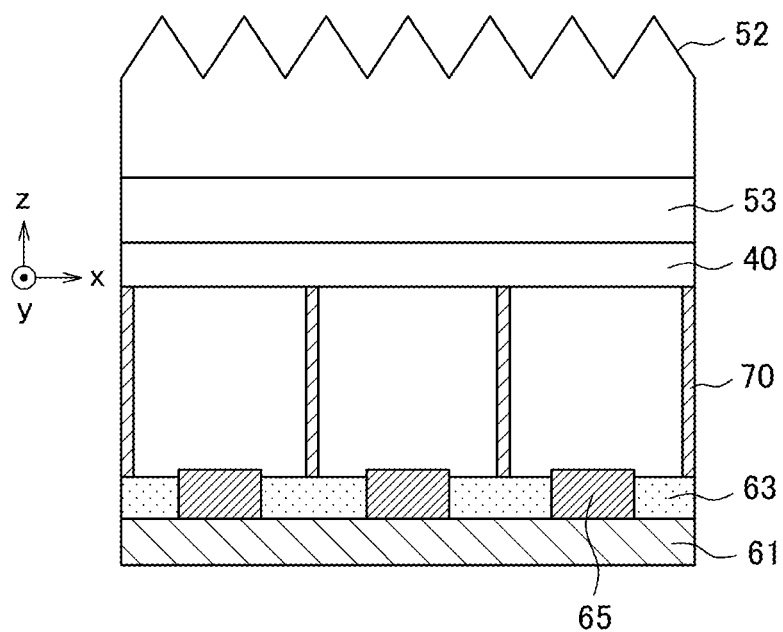
FIG. 19 is a cross sectional view of the segment of the back light according to embodiment 4.

In embodiments 1 through 3, blue LEDs are used for the light source. In this embodiment, the phosphorous material for color conversion is included in the LED package, thus, white light is supplied from the LED 65 itself. FIG. 19 is a cross sectional view of embodiment 4. As shown in FIG. 19, a color conversion sheet 51 is not necessary in the optical sheet group 50. Therefore, a leak of light through the color conversion sheet 51 can be eliminated.

In FIG. 19, the structure from the light source substrate 61 to the light guide 40 is the same as embodiment 1 except the LED is white LED 65. The structure of embodiment 4, however, can be applied to the structures of embodiment 2 and embodiment 3.

The above embodiments have been explained that one LED 60 is placed in a segment 141. The present invention, however, can be applicable even when plural LEDs 60 are placed in one segment. Even plural LEDs are placed in one segment 141, it is the same that applying the present invention can mitigate a leak of light to the neighboring segments.

What is claimed is:

1. A display device comprising:
a display panel and a back light,
wherein the back light includes a light source and optical sheet group,
the light source includes a light source substrate and LEDs disposed on the light source substrate,
each of bottom surfaces of the LEDs is connected to electrode pads on the light source substrate through flip chip bonding,
the light source is divided into segments in a plan view,
at least one of the LEDs is disposed in a segment,
the light source substrate, except tops of the LEDs, is covered by a protective film,
each of the LEDs emits light from a top surface,
a height of each of the top surfaces of the LEDs is higher than a height of a top surface of the protective film,
the protective film directly contacts with side surfaces of the LEDs,
the segment is partitioned with a partition plate made of non-transparent resin to form a rectangular area in the plan view,
the partition plate is disposed on the protective film,
a light guide is disposed between the optical sheet group and the partition plate, and
the partition plate directly contacts the light guide.

2. The display device according to claim 1, wherein an emitting region of the LED is nearer to the optical sheet group than a top surface of the protective film is.

3. The display device according to claim 1, wherein an area surrounded by the partition plate is a space.

4. The display device according to claim 1, wherein the partition plate is made of white PET resin.

5. The display device according to claim 1, wherein the protective film is made of white resin.

6. The display device according to claim 1, wherein the LED is a blue LED, and the optical sheet group includes a color conversion sheet.

7. The display device according to claim 1, wherein only one LED exists in the segment, and the optical sheet group includes a diffusion sheet.

8. The display device according to claim 1, wherein the optical sheet group includes a prism sheet, a color conversion sheet, and a diffusion sheet.

9. The display device according to claim 1, wherein an area surrounded by the partition plates is filled with transparent resin.

10. The display device according to claim 9, wherein a refractive index of the transparent resin is larger than a refractive index of the partition plate.

11. The display device according to claim 9, wherein phosphorous material as a color conversion element is dispersed in the transparent resin.

12. The display device according to claim 1, wherein the back light can be operated with a local dimming method.

13. The display device according to claim 1, wherein, the display panel is a liquid crystal display panel.

* * * * *